(12) United States Patent
Domit et al.

(10) Patent No.: US 10,000,856 B2
(45) Date of Patent: *Jun. 19, 2018

(54) ELECTROCHEMICAL CELL HAVING A CASCADE SEAL CONFIGURATION AND HYDROGEN RECLAMATION

(71) Applicant: Nuvera Fuel Cells, LLC, Billerica, MA (US)

(72) Inventors: Ed Domit, Westford, MA (US); Scott Blanchet, Chelmsford, MA (US); Roger Van Boeyen, Westford, MA (US); Kevin Beverage, Leominster, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/392,445

(22) Filed: Dec. 28, 2016

(65) Prior Publication Data
US 2017/0107633 A1  Apr. 20, 2017

Related U.S. Application Data

(63) Continuation of application No. 14/192,006, filed on Feb. 27, 2014, now Pat. No. 9,567,679.
(Continued)

(51) Int. Cl.
*C25B 9/04* (2006.01)
*C25B 9/08* (2006.01)
(Continued)

(52) U.S. Cl.
CPC .................. *C25B 9/08* (2013.01); *C25B 1/10* (2013.01); *C25B 1/12* (2013.01); *H01M 8/006* (2013.01);
(Continued)

(58) Field of Classification Search
CPC .... C25B 9/04; C25B 9/18; C25B 9/08; C25B 9/203; C25B 13/00; H01M 8/006
(Continued)

(56) References Cited

U.S. PATENT DOCUMENTS 3,326,722 A  6/1967 Hasbrouk
3,379,460 A  4/1968 Allyn
(Continued)

FOREIGN PATENT DOCUMENTS

DE  10 2004 028 857 A1  1/2006
JP  2004-115860 A  4/2004
(Continued)

OTHER PUBLICATIONS

PCT Notification of Transmittal of the International Search Report and the Written Opinion of the International Searching Authority issued in International Application No. PCT/US2014/018996 and dated Jun. 2, 2014 (11 pages).
(Continued)

*Primary Examiner* — Zulmariam Mendez
(74) *Attorney, Agent, or Firm* — Finnegan, Henderson, Farabow, Garrett & Dunner LLP.

(57) ABSTRACT

An electrochemical cell includes a pair of bipolar plates and a membrane electrode assembly between the bipolar plates. The electrochemical cell further includes a first seal defining a high pressure zone, wherein the first seal is located between the bipolar plates and configured to contain a first fluid within the high pressure zone. Further, the electrochemical cell includes a second seal defining an intermediate pressure zone, wherein the second seal is located between the bipolar plates and configured to contain a second fluid within the intermediate pressure zone. The first seal is configured to leak the first fluid into the intermediate pressure zone when the first seal unseats.

14 Claims, 8 Drawing Sheets

Related U.S. Application Data

(60) Provisional application No. 61/770,538, filed on Feb. 28, 2013.

(51) Int. Cl.

| | | |
|---|---|---|
| *H01M 8/00* | (2016.01) | |
| *H01M 8/0284* | (2016.01) | |
| *H01M 8/0267* | (2016.01) | |
| *H01M 8/1004* | (2016.01) | |
| *C25B 1/12* | (2006.01) | |
| *C25B 1/10* | (2006.01) | |
| *H01M 8/1018* | (2016.01) | |

(52) U.S. Cl.
CPC ....... *H01M 8/0267* (2013.01); *H01M 8/0284* (2013.01); *H01M 8/1004* (2013.01); *H01M 2008/1095* (2013.01); *H01M 2300/0082* (2013.01)

(58) Field of Classification Search
USPC .................................................. 204/254
See application file for complete search history.

(56) References Cited

U.S. PATENT DOCUMENTS

| | | | |
|---|---|---|---|
| 5,523,181 | A | 6/1996 | Stonehart et al. |
| 5,653,857 | A | 8/1997 | Getsy et al. |
| 6,036,194 | A | 3/2000 | Stamper |
| 6,309,521 | B1 | 10/2001 | Andrews et al. |
| 6,355,371 | B1 | 3/2002 | Farkash et al. |
| 7,014,939 | B2 | 3/2006 | Suenaga et al. |
| 7,670,719 | B2 | 3/2010 | Nakaishi et al. |
| 8,153,288 | B2 | 4/2012 | Sugita et al. |
| 8,877,406 | B2 | 11/2014 | Yoshikawa |
| 8,999,597 | B2 | 4/2015 | Ikezoe et al. |
| 9,005,840 | B2 | 4/2015 | Morimoto et al. |
| 9,567,679 | B2 | 2/2017 | Domit et al. |
| 2002/0122970 | A1 | 9/2002 | Inoue et al. |
| 2003/0022045 | A1 | 1/2003 | Wells et al. |
| 2003/0062268 | A1 | 4/2003 | Kosek et al. |
| 2003/0072988 | A1 | 4/2003 | Frisch et al. |
| 2004/0038102 | A1 | 2/2004 | Beckmann et al. |
| 2004/0040862 | A1 | 3/2004 | Kosek et al. |
| 2005/0136312 | A1 | 6/2005 | Bourgeois et al. |
| 2007/0231619 | A1 | 10/2007 | Strobel et al. |
| 2007/0298310 | A1 | 12/2007 | Kato |
| 2009/0004539 | A1 | 1/2009 | Ishikawa et al. |
| 2009/0075134 | A1 | 3/2009 | Tanaka et al. |
| 2009/0087713 | A1 | 4/2009 | Yoshida et al. |
| 2009/0280391 | A1 | 11/2009 | Chang et al. |
| 2010/0096392 | A1 | 4/2010 | Kamiya et al. |
| 2010/0167140 | A1 | 7/2010 | Balliet |
| 2010/0167410 | A1 | 7/2010 | Balliet |
| 2014/0051007 | A1 | 2/2014 | Blanchet et al. |
| 2015/0030957 | A1 | 1/2015 | Van Boeyen et al. |
| 2016/0060775 | A1 | 3/2016 | Domit et al. |

FOREIGN PATENT DOCUMENTS

| | | |
|---|---|---|
| JP | 2009-37960 A | 2/2009 |
| JP | 2010-165625 A | 7/2010 |
| JP | H10-286572 A | 10/2010 |
| WO | WO 2014/134295 A1 | 9/2014 |
| WO | WO 2015/017429 A2 | 2/2015 |
| WO | WO 2016/033147 A1 | 3/2016 |

OTHER PUBLICATIONS

Australian Patent Application No. 2014223472, by Nuvera Fuel Cells, Inc.: Examination Report No. 1, dated Apr. 24, 2017 (3 pages).

Australian Patent Application No. 2014296367, by Nuvera Fuel Cells, Inc.: Examination Report No. 1, dated May 31, 2017 (4 pages).

Chinese Patent Application No. 201480010976.5, by Nuvera Fuel Cells, Inc.: Office Action, dated Mar. 14, 2017, with English Translation (10 pages).

Chinese Patent Application No. 201480010976.5, by Nuvera Fuel Cells, Inc.: Office Action, dated Oct. 18, 2017, with English Translation (5 pages).

Chinese Patent Application No. 201480053600.2, by Nuvera Fuel Cells, Inc.: Office Action, dated Sep. 20, 2017, with English Translation (11 pages).

Japanese Patent Application No. 2015-560305, by Nuvera Fuel Cells, Inc.: Notice of Reasons for Rejection, dated Jan. 25, 2018, with English Translation (11 pages).

U.S. Appl. No. 14/835,969: Restriction Requirement, dated Dec. 6, 2016 (7 pages).

U.S. Appl. No. 14/835,969: Non-Final Office Action, dated Aug. 21, 2017 (11 pages).

U.S. Appl. No. 14/835,969: Final Office Action, dated Mar. 19, 2018 (11 pages).

Invitation to Pay Additional Fees and Communication Relating to the Results of the Partial International Search, issued in PCT Application No. PCT/US2014/048656, dated Dec. 1, 2014 (7 pages).

International Search Report and Written Opinion issued in PCT Application No. PCT/US2014/048656, dated Feb. 2, 2015 (17 pages).

International Search Report and Written Opinion issued in PCT Application No. PCT/US2015/046871, dated Oct. 16, 2015 (9 pages).

U.S. Appl. No. 14/192,006, filed Feb. 27, 2014, by Domit et al.: Non-Final Office Action, dated Nov. 13, 2015 (11 pages).

U.S. Appl. No. 14/192,006, filed Feb. 27, 2014, by Domit et al.: Final Office Action, dated Apr. 19, 2016 (19 pages).

U.S. Appl. No. 14/192,006, filed Feb. 27, 2014, by Domit et al.: Advisory Action, dated Jul. 1, 2016 (3 pages).

U.S. Appl. No. 14/192,006, filed Feb. 27, 2014, by Domit et al.: Notice of Allowance, dated Sep. 28, 2016 (7 pages).

U.S. Appl. No. 14/445,357, filed Jul. 29, 2014, by Van Boeyen: Non-Final Office Action, dated Dec. 16, 2015 (12 pages).

U.S. Appl. No. 14/445,357, filed Jul. 29, 2014, by Van Boeyen: Final Office Action, dated Aug. 1, 2016 (13 pages).

U.S. Appl. No. 14/445,357, filed Jul. 29, 2014, by Van Boeyen: Advisory Action, dated Nov. 15, 2016 (3 pages).

U.S. Appl. No. 14/445,357, filed Jul. 29, 2014, by Van Boeyen: Non-Final Office Action, dated Apr. 20, 2017 (13 pages).

U.S. Appl. No. 14/445,357, filed Jul. 29, 2014, by Van Boeyen: Non-Final Office Action, dated Aug. 24, 2017 (14 pages).

U.S. Appl. No. 14/835,969: Non-Final Office Action, dated Feb. 10, 2017 (10 pages).

U.S. Appl. No. 14/835,969: Applicant-Initiated Interview Summary, dated May 4, 2017 (2 pages).

ELECTROCHEMICAL CELL HAVING A CASCADE SEAL CONFIGURATION AND HYDROGEN RECLAMATION

RELATED APPLICATIONS

This application is a continuation application of U.S. application Ser. No. 14/192,006, filed Feb. 27, 2014, which claims the benefit of U.S. Provisional Application No. 61/770,538, filed Feb. 28, 2013, the entire contents of which are expressly incorporated herein by reference.

TECHNICAL FIELD

The present disclosure is directed towards an electrochemical cell, and more specifically, to an electrochemical cell having a cascade sealing configuration and configured for hydrogen reclamation.

BACKGROUND

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms can electrochemically split into electrons and protons (hydrogen ions) at the anode. The electrons flow through the circuit to the cathode and generate electricity, while the protons diffuse through the electrolyte membrane to the cathode. At the cathode, hydrogen protons can react with electrons and oxygen (supplied to the cathode) to produce water and heat.

An electrolysis cell represents a fuel cell operated in reverse. A basic electrolysis cell can function as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion.

An electrochemical hydrogen compressor (EHC), for example, can be used to selectively transfer hydrogen from one side of a cell to another. An EHC can comprise a proton exchange membrane sandwiched between a first electrode (i.e., an anode) and a second electrode (i.e., a cathode). A gas containing hydrogen can contact the first electrode and an electric potential difference can be applied between the first and second electrodes. At the first electrode, the hydrogen molecules can be oxidized and the reaction can produce two electrons and two protons. The two protons are electrochemically driven through the membrane to the second electrode of the cell, where they are rejoined by two rerouted electrons and reduced to form a hydrogen molecule. The reactions taking place at the first electrode and second electrode can be expressed as chemical equations, as shown below.

$H_2 \rightarrow 2H^+ + 2e^-$   First electrode oxidation reaction:

$2H^+ + 2e^- \rightarrow H_2$   Second electrode reduction reaction:

$H_2 \rightarrow H_2$   Overall electrochemical reaction:

EHCs operating in this manner are sometimes referred to as a hydrogen pumps. When the hydrogen accumulated at the second electrode is restricted to a confined space, the electrochemical cell compresses the hydrogen or raises the pressure. The maximum pressure or flow rate an individual cell is capable of producing can be limited based on the cell design.

To achieve greater compression or higher pressure, multiple cells can be linked in series to form a multi-stage EHC. In a multi-stage EHC the gas flow path, for example, can be configured so the compressed output gas of the first cell can be the input gas of the second cell. Alternatively, single-stage cells can be linked in parallel to increase the throughput capacity (i.e., total gas flow rate) of an EHC. In both a single-stage and multi-stage EHC, the cells can be stacked and each cell can include a cathode, an electrolyte membrane, and an anode. Each cathode/membrane/anode assembly constitutes a "membrane electrode assembly", or "MEA", which is typically supported on both sides by bipolar plates. In addition to providing mechanical support, the bipolar plates physically separate individual cells in a stack while electrically connecting them. The bipolar plates also act as current collectors/conductors, and provide passages for the fuel. Typically, bipolar plates are made from metals, for example, stainless steel, titanium, etc., and from non-metallic electrical conductors, for example, graphite.

Electrochemical hydrogen manipulation has emerged as a viable alternative to the mechanical systems traditionally used for hydrogen management. Successful commercialization of hydrogen as an energy carrier and the long-term sustainability of a "hydrogen economy" depends largely on the efficiency and cost-effectiveness of fuel cells, electrolysis cells, and other hydrogen manipulation/management systems (i.e., EHCs). Gaseous hydrogen is a convenient and common form for energy storage, usually by pressurized containment. Advantageously, storing hydrogen at high pressure yields high energy density.

Mechanical compression is a traditional means to achieve compression. However, there are disadvantages to mechanical compression. For example, substantial energy usage, wear and tear on moving parts, excessive noise, bulky equipment, and hydrogen embrittlement. Pressurization by thermal cycling is an alternative to mechanical compression, but like mechanical compression the energy usage is substantial. In contrast, electrochemical compression is quiet, scalable, modular, and can achieve high energy efficiency.

One challenge for electrochemical hydrogen compression is the safety concern regarding pressurized hydrogen gas. Hydrogen gas is extremely flammable and high pressure hydrogen gas raises safety issues. A major concern can include the leaking or unintended release of the high pressure gas from the electrochemical compressor. A catastrophic release could pose a safety hazard.

Moreover, even a small leak that may not rise to the level of a significant safety concern nonetheless reduces the efficiency of the electrochemical compressor. Therefore, there is a need to prevent or reduce hydrogen leakage.

SUMMARY

In consideration of the aforementioned circumstances, the present disclosure is directed toward an electrochemical cell having a cascade seal configuration constructed to limit the unintended release of hydrogen from the cell. In addition, the cascade seal configuration can enable the collection and recycling of hydrogen leaked from the cell.

One aspect of the present disclosure is directed to an electrochemical cell comprising: a pair of bipolar plates and a membrane electrode assembly located between the pair of bipolar plates, wherein the membrane electrode assembly comprises an anode, a cathode, and a proton exchange membrane disposed therebetween; a first seal defining a high pressure zone, wherein the first seal is located between the bipolar plates and configured to contain a first fluid within the high pressure zone; a second seal defining an intermediate pressure zone, wherein the second seal is located between the bipolar plates and configured to contain a second fluid within the intermediate pressure zone; and wherein the first seal is configured to leak the first fluid into the intermediate pressure zone when the first seal unseats.

In another embodiment, the electrochemical cell can further comprise a third seal defining a low pressure zone configured to contain a third fluid within the low pressure zone, wherein the second seal is configured to leak the second fluid into the low pressure zone when the second seal unseats. In another embodiment, the first seal can be contained within the second seal and the second seal is contained with the third seal. In another embodiment, the first fluid can be at a higher pressure than the second fluid and the second fluid is at a higher pressure than the third fluid. In another embodiment, the first seal, the second seal, and the third seal can have a generally rectangular cross-section.

In another embodiment, the thickness of the third seal can be greater than the second seal and the thickness of the second seal is greater than the first seal. In another embodiment, the first seal, the second seal, and the third seal can have a generally circular cross-section. In another embodiment, the first fluid can be high pressure hydrogen, the second fluid can be lower pressure hydrogen, and the third fluid can be coolant fluid. In another embodiment, the third fluid can be nitrogen and the low pressure zone includes a nitrogen blanket surrounding the electrochemical cell configured to detect a leak of at least one of the first fluid and the second fluid from within the electrochemical cell. In another embodiment, the pressure of the third fluid can be monitored, and a rise in the pressure indicates an unseating of at least the second seal.

In another embodiment, the electrochemical cell can be configured to shut down before the third fluid reaches a pressure at which the third seal unseats. In another embodiment, the first seal, the second seal, and the third seal within the pair of bipolar plates can be configured to remain seated, preventing the leaking of the first fluid, the second fluid, and the third fluid, when a closing force being applied to the pair of bipolar plates is greater than the opening force within the pair of bipolar plates. In another embodiment, the first seal can be configured to unseat before the second seal or the third seal causing the first fluid to leak past the first seal into the intermediate pressure zone when a closing force applied to the pair of bipolar plates approaches an opening force within the pair of bipolar plates, which causes a first separation of the pair of bipolar plates. In another embodiment, the second seal can be configured to unseat causing the second fluid to leak past the second seal into the low pressure zone when the closing force further approaches the opening force causing a second separation of the pair of bipolar plates.

In another embodiment, the first fluid that leaks into the intermediate pressure zone combines with the second fluid and can be recycled. In another embodiment, the second fluid leaks into the low pressure zone and the second fluid combines with the third fluid and flows out of the electrochemical cell and can be reclaimed. In another embodiment, the electrochemical cell can configured to receive a closing force applied to the pair of bipolar plates, wherein the closing force is adjustable during operation of the electrochemical cell based on the pressure of the low pressure zone, the intermediate pressure zone, and the high pressure zone. In another embodiment, the electrochemical cell can further comprise a pair of ancillary seals located outside the first seal and inside the second seal, wherein the pair of ancillary seals defines two ancillary high pressure zones in fluid communication with the high pressure zone. In another embodiment, at least one of the bipolar plates can include a plurality of components and utilizes a cascade seal configuration between the plurality of components.

Another aspect of the present disclosure is directed to an electrochemical cell comprising: a pair of bipolar plates and a membrane electrode assembly located between the pair of bipolar plates; a high pressure zone located between the bipolar plates containing a first fluid; an intermediate pressure zone located between the bipolar plates containing a second fluid; and a low pressure zone containing a third fluid; wherein the electrochemical cell is configured to transition between a first configuration, a second configuration, and a third configuration based on at least one of a closing force applied to the bipolar plates and an opening force produced by a pressure of at least one of the first fluid, second fluid, and third fluid.

In another embodiment, the first configuration can provide substantially no leaking of fluid between the high pressure zone, the intermediate pressure zone, and the low pressure zone; the second configuration can provide leaking of a portion of the first fluid from the high pressure zone to the intermediate pressure zone; and the third configuration can provide leaking of a portion of first fluid from the high pressure zone to the intermediate pressure zone and leaking of a portion of second fluid from the intermediate pressure zone to the low pressure zone. In another embodiment, the electrochemical cell can further comprise a hydrogen reclamation apparatus in fluid communication with the low pressure zone of the electrochemical cell, wherein the hydrogen reclamation apparatus is configured to reclaim the portion of second fluid leaked into the low pressure zone and reintroduce the reclaimed second fluid into the intermediate pressure zone of the electrochemical cell.

In another embodiment, the pressure of the third fluid in the low pressure zone can be monitored, and a rise in the pressure of the third fluid engages the hydrogen reclamation apparatus. In another embodiment, the high pressure zone can be contained within the intermediate pressure zone and the intermediate pressure zone can be contained within the low pressure zone. In another embodiment, the electrochemical cell can further comprise a first seal configured to contain the first fluid in the high pressure zone, a second seal configured to contain the second fluid in the intermediate pressure zone, and a third seal configured to contain the third fluid in the low pressure zone. In another embodiment, the second configuration can include a first separation between the bipolar plates, and the third configuration includes a second separation greater than the first separation between the bipolar plates.

Another aspect of the present disclosure is directed to a method of tuning the closing force of an electrochemical cell having a cascade seal configuration, the method comprising: providing an electrochemical cell having a plurality of seals in a cascade seal configuration; applying an initial closing force to the electrochemical cell based on the expected operating pressure; operating the electrochemical cell; monitoring the pressure of the electrochemical cell; and adjusting the closing force applied to the electrochemical cell based on the monitored pressure, wherein adjusting the closing force changes the pressure at which at least one of the plurality of seals unseats.

Another aspect of the present disclosure is directed to a bipolar plate for an electrochemical cell comprising at least two components, a first seal defining a high pressure zone, wherein the first seal is located between the components and configured to contain a first fluid within the high pressure zone, a second seal defining an intermediate pressure zone comprising intermediate pressure volume and intermediate pressure ports, wherein the second seal is located between the components and configured to contain a second fluid within the intermediate pressure zone, wherein the first seal is configured to leak the first fluid into the intermediate pressure zone when the first seal fails and the first fluid can be collected in the intermediate pressure volume and discharged from the intermediate pressure ports.

Another aspect of the present disclosure is directed to an electrochemical cell comprising a pair of bipolar plates and a membrane electrode assembly located between the pair of bipolar plates and a first cascade seal configuration between the pair of bipolar plates, wherein each bipolar plate comprises at least two components and a second cascade seal configuration between the at least two components.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the present disclosure and together with the description, serve to explain the principles of the disclosure.

DESCRIPTION OF THE EMBODIMENTS

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to an electrochemical cell employing hydrogen, it is understood that the devices and methods of the present disclosure can be employed with various types of fuel cells and electrochemical cells, including, but not limited to electrolysis cells, hydrogen purifiers, hydrogen expanders, and hydrogen compressors.

Figure 1:
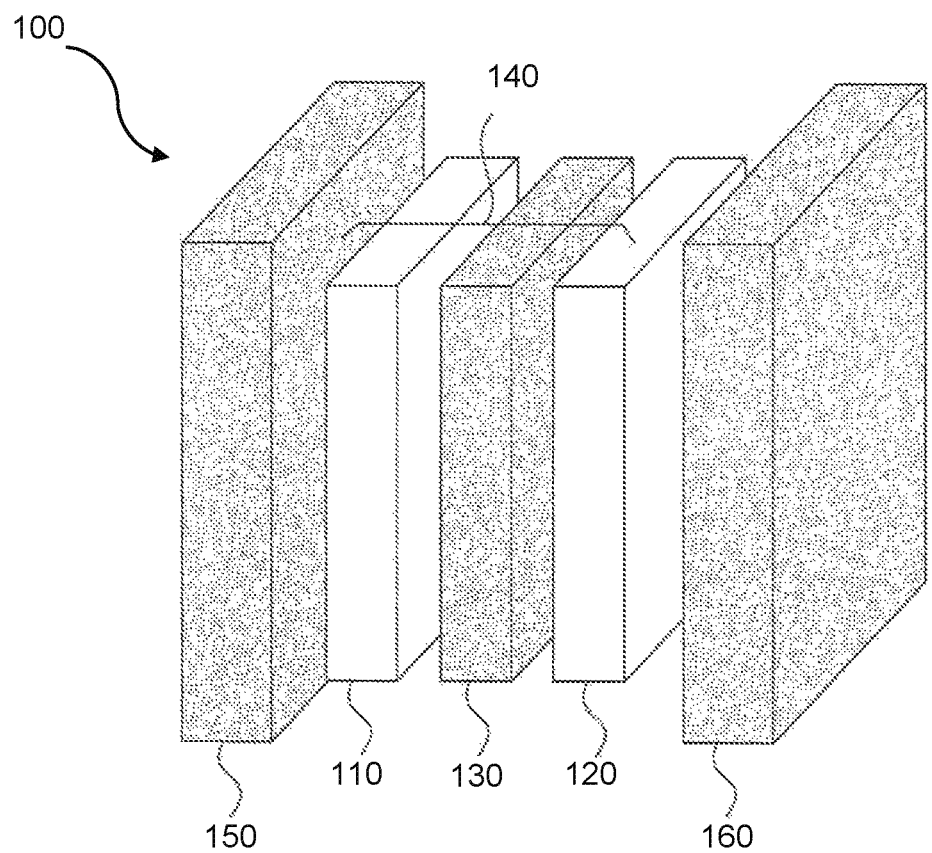
FIG. 1 is a side view of part of an electrochemical cell, showing various components of an electrochemical cell.

FIG. 1 shows an exploded side view of an electrochemical cell 100, according to an exemplary embodiment. Electrochemical cell 100 can comprise an anode 110, a cathode 120, and a proton exchange membrane (PEM) 130 disposed in between anode 110 and cathode 120. Anode 110, cathode 120, and PEM 130 combined can comprise a membrane electrode assembly (MEA) 140. PEM 130 can comprise a pure polymer membrane or composite membrane where other material, for example, silica, heteropolyacids, layered metal phosphates, phosphates, and zirconium phosphates can be embedded in a polymer matrix. PEM 130 can be permeable to protons while not conducting electrons. Anode 110 and cathode 120 can comprise porous carbon electrodes containing a catalyst layer. The catalyst material, for example platinum, can increase the reaction of fuel.

Electrochemical cell 100 can further comprise two bipolar plates 150, 160. Bipolar plates 150, 160 can act as support plates, conductors, provide passages to the respective electrode surfaces for the fuel, and provide passages for the removal of the compressed fuel. Bipolar plates 150, 160 can also include access channels for cooling fluid (i.e., water, glycol, or water glycol mixture). The bipolar plates can be made from aluminum, steel, stainless steel, titanium, copper, Ni—Cr alloy, graphite or any other electrically conductive material. Bipolar plates 150, 160 can separate electrochemical cell 100 from the neighboring cells in an electrochemical stack (not shown). For example, multiple electrochemical cells 100 can be linked in series to form a multi-stage electrochemical hydrogen compressor (EHC) or stacked in parallel to form a single-stage EHC.

In operation, according to an exemplary embodiment, hydrogen gas can be supplied to anode 110 through bipolar plate 150. An electric potential can be applied between anode 110 and cathode 120, wherein the potential at anode 110 is greater than the potential at cathode 120. The hydrogen at anode 110 can be oxidized causing the hydrogen to split into electrons and protons. The protons are electrochemically transported or "pumped" through PEM 130 while the electrons are rerouted around PEM 130. At cathode 120 on the opposite side of PEM 130 the transported protons and rerouted electrons are reduced to form hydrogen. As more and more hydrogen is formed at cathode 120 the hydrogen can be compressed and pressurized within a confined space.

Figure 2A:
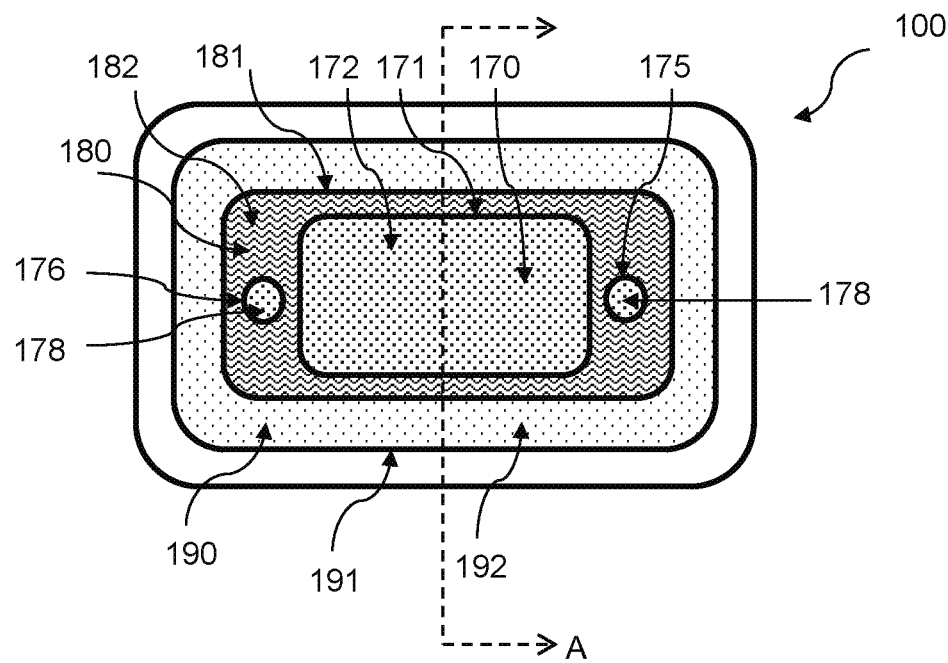
FIG. 2A is a front view of part of an electrochemical cell, showing the various seals and pressure zones of the cell, according to an exemplary embodiment.

Within electrochemical cell 100, a plurality of different pressure zones and a plurality of seals can define one or more different pressure zones. FIG. 2A shows the plurality of different seals and pressure zones within electrochemical cell 100. As shown in FIG. 2A, the plurality of seals can include a first seal 171, a second seal 181, and a third seal 191. First seal 171 can be contained entirely within second seal 181 and second seal 181 can be contained entirely within third seal 191. In addition, the plurality of seals can further include ancillary first seals 175, 176. Ancillary seal 175 and 176 can be located outside first seal 171, but within second seal 181.

First seal 171 can define high pressure zone 170 and be configured to contain a first fluid 172 (e.g., hydrogen) within high pressure zone 170. First seal 171 can delimit the outer boundaries of high pressure zone 170. High pressure zone 170 can correspond to the high pressure cathode 120 side of PEM 130. Hydrogen formed at cathode 130 can be collected in high pressure zone 170 and contained by first seal 171. Hydrogen within high pressure zone 170 can be compressed and, as a result, increase in pressure as more and more hydrogen is formed in high pressure zone 170. Hydrogen in high pressure zone 170 can be compressed to a pressure great than 15,000 psi.

Ancillary first seals 175, 176 can define two ancillary high pressure zones 177, 178 that can be in fluid communication with high pressure zone 170. Ancillary high pressure zones 177, 178 can be common passages configured to discharge the first fluid 172 from high pressure zone 170. Ancillary high pressure zones 177, 178 can be in fluid communication with common passages of adjacent electrochemical cell in a multi-cell electrochemical compressor.

Second seal 181 can define intermediate pressure zone 180 and be configured to contain a second fluid 182 within intermediate pressure zone 180. Second seal 181 can delimit the outer boundaries of intermediate pressure zone 180. Intermediate pressure zone 180 can correspond to the low pressure anode 110 side of PEM 130. Second fluid 182 (e.g., hydrogen or gas mixture containing hydrogen) supplied to anode 110 can be contained in intermediate pressure zone 180 by second seal 181 until it is oxidized and "pumped" across PEM 130 to cathode 120 and high pressure zone 170. Second fluid 182 within intermediate pressure zone 180 can vary based on the pressure being supplied. Regardless, second fluid 182 in intermediate pressure zone 180 can generally be lower pressure than first fluid 172 in high pressure zone 170.

Third seal 191 can define low pressure zone 190 and be configured to contain a third fluid 192 within low pressure zone 190. Third seal 191 can delimit the outer boundaries of low pressure zone 190. Low pressure zone 190 can comprise coolant fluid passages and third fluid 192 can comprise coolant fluid. Coolant fluid can include water, glycol, or combination thereof. In a high temperature system oil can be used as a coolant fluid. Third fluid 192 can generally be maintained at a pressure less than the pressure of second fluid 182 in intermediate pressure zone 180 and first fluid 172 in high pressure zone 170. Low pressure zone 190 can include an inlet passage and outlet passage (not shown) configured so third fluid 192 can be circulated through low pressure zone 190.

Figure 2B:
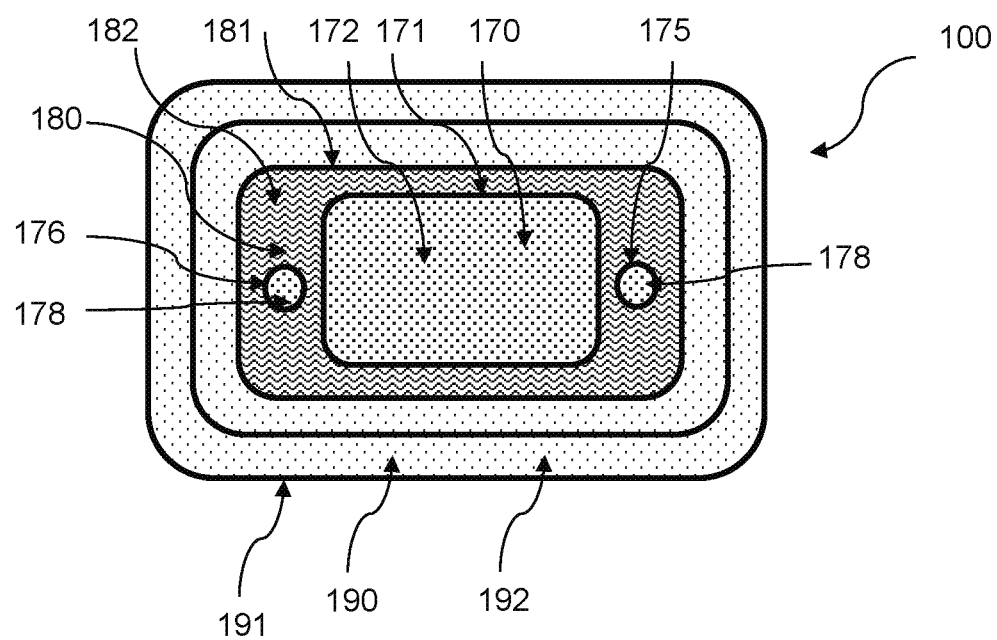
FIG. 2B is a front view of part of an electrochemical cell, showing the various seals and pressure zones of the cell, according to an exemplary embodiment.

In an alternate embodiment as shown in FIG. 2B, low pressure zone 190 can be located not within electrochemical cell 100, but rather in the area surrounding electrochemical cell 100 or a plurality of cells forming a stack. For example, low pressure zone 190 can contain nitrogen 192 forming a nitrogen blanket surrounding electrochemical cell 100 or in other embodiments surrounding a stack of cells.

Figure 3A:
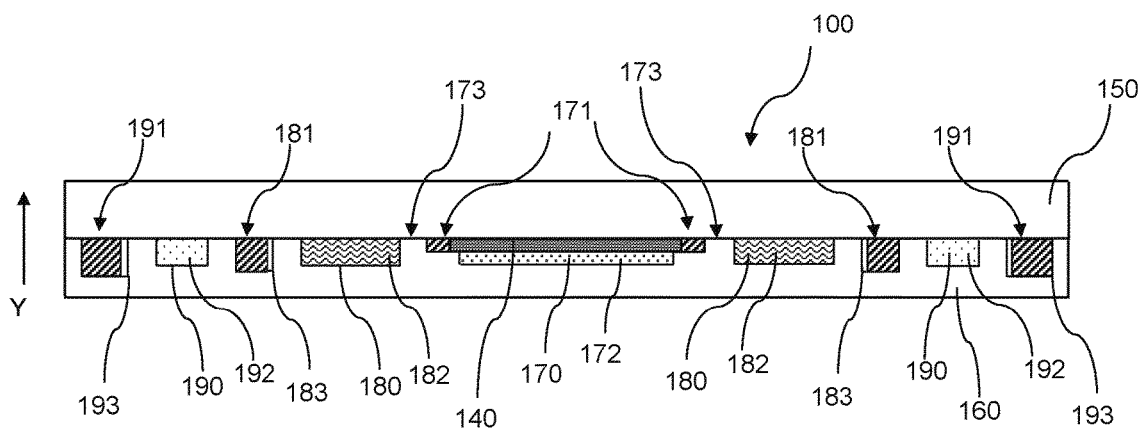
FIG. 3A is a cross-sectional view of part of an electrochemical cell, according to an exemplary embodiment.

FIG. 3A shows a cross-sectional view of electrochemical cell 100 along plane A of FIG. 2A. As described in FIG. 2A, electrochemical cell 100 can comprise MEA 140 and bipolar plates 150, 160. Between bipolar plates 150, 160 can be first seal 171 defining high pressure zone 170, second seal 181 defining intermediate pressure zone 180, and third seal 191 defining low pressure zone 190. In FIG. 3A, first seal 171, second seal 181, and third seal 191 can each be shown as two separate cross-sections of a single continuous seal as previously shown in FIG. 2A.

As shown in FIG. 3A, first seal 171 can be positioned against a first shoulder 173. First shoulder 173 can be configured to maintain the position of first seal 171 as pressure can build within high pressure zone 170. Pressure within high pressure zone 170 can apply an outward force against first seal 171. The height of first shoulder 173 can range from about 98% to about 25% of the uncompressed thickness of first seal 171.

In the particular embodiment shown in FIG. 3A there is no shoulder located interior to first seal 171. The absence of an interior shoulder as shown in FIG. 3A can allow for first seal 171 to be combined, joined, connected, or integral to MEA 140 or portion thereof. Having first seal 171 integral to MEA 140 can facilitate consistent, efficient and streamlined assembly of electrochemical cell 100. However, in alternate embodiments an additional shoulder can be positioned interior to first seal 171 that can be configured to create a groove in which first seal 171 can be positioned.

Referring again to FIG. 3A, second seal 181 can be positioned in a second groove 183 formed between two shoulders in bipolar plate 160. To the interior of second groove 183 and second seal 181 can be intermediate pressure zone 180 and to the exterior of second groove 183 and second seal 181 can be low pressure zone 190. The depth of second groove 183 can range from about 98% to about 25% of the uncompressed thickness of second seal 181.

Third seal 191 as shown in FIG. 3A, can be positioned in a third groove 193 formed between two shoulders in bipolar plate 160. To the interior of third groove 193 and third seal 191 can be low pressure zone 190 and to the exterior third groove 193 and third seal 191 can be the surrounding environment of electrochemical cell 100. The depth of third groove 193 can range from about 98% to about 25% of the uncompressed thickness of third seal 191.

During assembly first seal 171, second seal 181, and third seal 191 between bipolar plate 150, 160 can be compressed by a predetermined percentage of their uncompressed thickness by selecting the appropriate height of their respective shoulders 173 or depth of their respective grooves, 183 and 193. First shoulder 173 and the shoulders forming second groove 183 and third groove 193 can act as a stop, as shown in FIG. 3A, for bipolar plate 150. By acting as a stop the possibility of over compressing the seals can be reduced. The elevation of first shoulder 173 and the shoulders forming second groove 183 and third groove 193 can be equal, such that, bipolar plate 150 can make contact with all the shoulder surfaces of bipolar plate 160 at once when the surfaces are parallel.

In alternate embodiments (not shown), second groove 183 and third groove 193 can be formed in bipolar plate 150 rather than bipolar plate 160. In another embodiment, second groove 183 can be formed in either bipolar plate 150, 160 while third groove 193 is formed in the other plate. In yet another embodiment, portions of second groove 183 and third groove 193 can be formed in both bipolar plates 150, 160.

Second groove 183 and third groove 193 can have a cross-sectional geometry that corresponds to the shape of second seal 181 and third seal 191. For example, the geometry of the seal and groove cross-section can be a square, rectangle, triangle, polygon, circle, or oval. In various embodiments the width of second seal 181 and third seal 191 can be less than the corresponding groove. The additional space in the grooves can allow for the expanding and contracting of the seals caused by temperature change, pressure change from the internal gases, and pressure change from the bipolar plate compression. As shown in FIG. 3A, typically the seals can be forced outwardly to the outer most position within the grooves because the seals experience higher pressure from the interior side versus the exterior side.

In other embodiments, the depth of the grooves (e.g., second groove 183 and third groove 193) can be reduced to zero or eliminated and first seal 171, second seal 181, and third seal 191 can be formed of flat gasket material that can be cut in an enlarging pattern configured to maintain the cascade configuration. For example, first fluid leaked past first seal 171 can be collected in intermediate pressure zone 180.

First seal 171, second seal 181, and third seal 191 can be a gasket, O-ring, or other sealing component. First seal 171, second seal 181, and third seal 191 can be made of an elastomeric or polymeric sealing material, for example, silicone, EPDM (ethylenepropylene-diene-monomer), fluoroelastomer, nitrile rubber (Buna-N), PTFE (polytetrafluoroethylene), polysulfone, polyetherimide, polychenylene sulfide, PEEK (polyether ether ketone), polyimide, PET (polyethylene terephthalate), PEN (polyethylene naphthalate), HDPE (high-density polyethylene), polyurethane, neoprene, acetal, nylon, polybutylene terephthalate, NBR (acrylonitrile-butadiene rubber), etc. The material of each seal can be different than the material of the other seals, the material can be the same for just two of the seals, or the material can be the same for all the seals.

Like the material, the thickness of each seal can be different than the other seals. Thickness can be measured along a vertical axis (Y) of electrochemical cell 100. As shown in FIG. 3A, the thickness of second seal 181 is greater than the thickness of first seal 171 and the thickness of third seal 191 is greater than the thickness of second seal 181. Consequently, the outermost seal, third seal 191, can have the greatest thickness and the innermost seal, first seal 171, can have the smallest thickness. For example, the thickness of first seal 171 can range between about 0.01 mm and about 1.0 mm, the thickness of second seal 181 can range between about 0.02 mm and about 2.0 mm, and the thickness of third seal 191 can range between about 0.03 mm and 3.0 mm.

For embodiments where the cross-sectional geometry of first seal 171, second seal 181, and third seal 191 can be a circle or oval, the thickness as described above can refer to the diameter of the circle or oval cross-section.

Figure 3B:
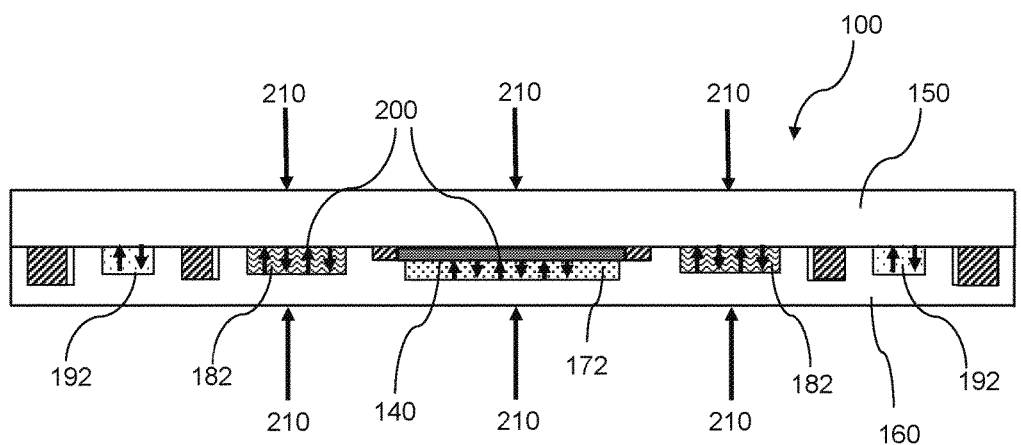
FIG. 3B is a cross-sectional view of part of an electrochemical cell, showing various forces, according to an exemplary embodiment.

As shown in FIG. 3B, during operation of electrochemical cell 100, the pressure of first fluid 172, second fluid 182, and third fluid 192 applied within each corresponding zone between bipolar plates 150, 160 can produce an opening force 200. Opening force 200 unopposed can cause bipolar plate 150, 160 to separate. In order to prevent opening force 200 from separating bipolar plates 150, 160, a closing force 210 can be applied to the plates to oppose and overcome opening force 200. It is understood that the pressure of first fluid 172, second fluid 182, and third fluid 192 would produce more forces than those represented by the plurality of arrows representing opening force 200. For example, lateral forces (not shown) perpendicular to opening force 200 would be produced as well as other forces pointing outwardly from each pressure zone in all possible directions.

Figure 4A:
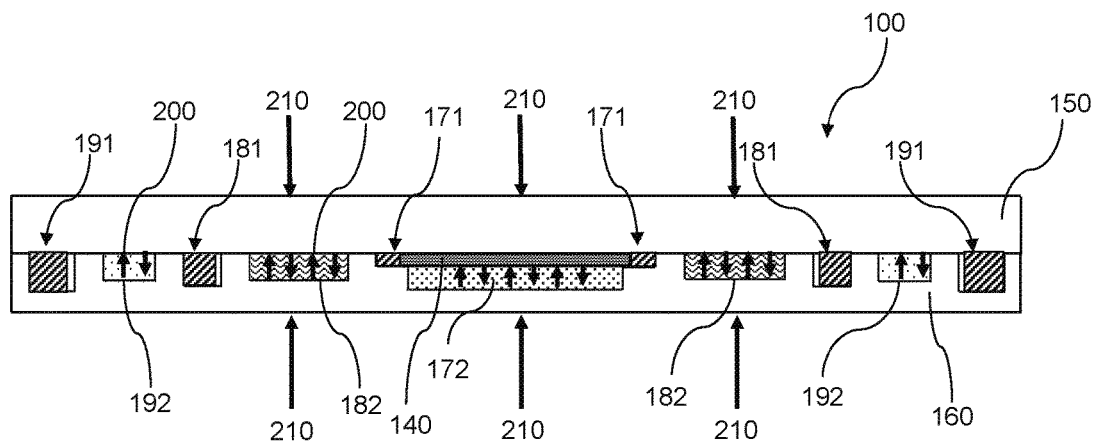
FIG. 4A is a cross-sectional view of part of an electrochemical cell, showing a first configuration, according to an exemplary embodiment.

FIG. 4A shows a cross-section of electrochemical cell 100 in a first configuration. Electrochemical cell 100 can maintain first configuration when closing force 210 is sufficient to overcome opening force 200 and hold bipolar plates 150, 160 substantially together. While in first configuration first seal 171, second seal 181, and third seal 191 can all maintain contact with both the top and bottom sealing surfaces of bipolar plate 150, 160, preventing leaking or bypassing of first fluid 172, second fluid 182, or third fluid 192. In this particular situation, all seals are fulfilling their function.

When electrochemical cell 100 is in first configuration, as described above, the actual measurement of the separation between the surfaces of bipolar plates 150, 160 can vary. For example, the separation can range from about 0.00 mm to about 0.01 mm, to about 0.05 mm, to about 0.10 mm.

Figure 4B:
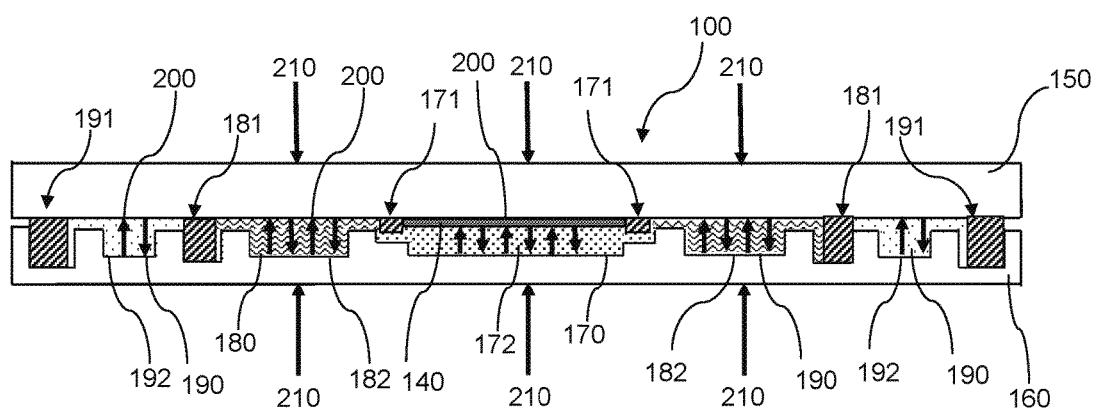
FIG. 4B is a cross-sectional view of part of an electrochemical cell, showing a second configuration, according to an exemplary embodiment.

FIG. 4B shows a cross-section of electrochemical cell 100 in a second configuration. Electrochemical cell 100 can change to second configuration when closing force 210 is reduced or opening force 200 is increased (e.g., first fluid 172 pressure increases) causing bipolar plates 150, 160 to separate. As shown in FIG. 4B, the first separation of bipolar plates 150, 160 can cause first seal 171 to unseat allowing the bypass of first fluid 172 from high pressure zone 170 into intermediate pressure zone 180. In the particular embodiment shown in FIG. 4B, first seal 171 is shown to unseat from bipolar plate 160 first, allowing the flow of first fluid 172 under and around first seal 171. However, it is understood that in alternate embodiments (not shown), first seal 171 can unseat from bipolar plate 150 first, allowing the flow of first fluid 172 over first seal 171 by passing between first seal 171 and MEA 140.

The flow of first fluid 172 from high pressure zone 170 to intermediate pressure zone 180 can be caused by the pressure differential between first fluid 172 and second fluid 182 and may travel along the path of least resistance. First seal 171 can be configured to be the first of the seals to unseat by having a thickness less than second seal 181 and third seal 191. This can allow third seal 191 and second seal 181 to maintain contact with both sealing surfaces preventing fluid from bypassing either seal despite the first separation of bipolar plates 150, 160 present in second configuration.

When electrochemical cell 100 is in second configuration, as described above, the actual measurement of the first separation that exists between bipolar plates 150, 160 can vary. For example, first separation can range from about 0.01 mm to about 0.05 mm, to about 0.10 mm, to about 0.25 mm.

Figure 4C:
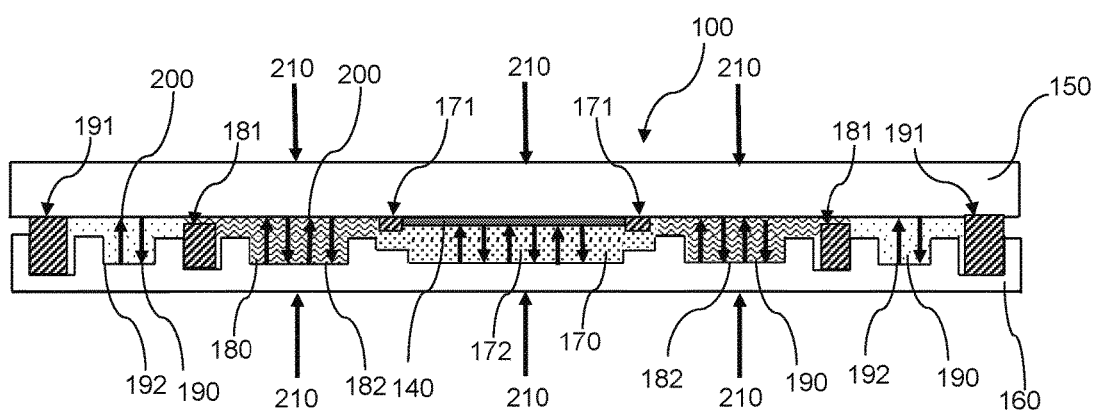
FIG. 4C is a cross-sectional view of part of an electrochemical cell, showing a third configuration, according to an exemplary embodiment.

FIG. 4C shows a cross-section of electrochemical cell 100 in a third configuration. Electrochemical cell 100 can change to third configuration when closing force 210 is further reduced or opening force 200 is further increased causing bipolar plates 150, 160 to undergo second separation. As shown in FIG. 4C, second separation of bipolar plates 150, 160 can cause both first seal 171 and second seal 181 to unseat allowing the bypass of first fluid 172 from high pressure zone 170 and second fluid 182 from intermediate pressure zone 180 into low pressure zone 190. In the particular embodiment shown in FIG. 4C, second seal 181 is shown to unseat from bipolar plate 150 first, allowing the flow of second fluid 182 over second seal 181. However, it is understood that in alternate embodiments (not shown), second seal 181 can unseat from bipolar plate 160 first, allowing the flow of second fluid 182 under and around second seal 181.

The flow of second fluid 182 from intermediate pressure zone 180 to low pressure zone 190 can be caused by the pressure differential between second fluid 182 and third fluid 192. Second seal 181 can be configured to be the second seal to unseat by being thicker than first seal 171, but not as thick as third seal 191. Therefore, because third seal 191 can be thicker than both first seal 171 and second seal 181, third seal 191 can maintain contact with both sealing surfaces preventing flow from bypassing notwithstanding the second separation of bipolar plates 150, 160.

When electrochemical cell 100 is in third configuration, as described above, the actual measurement of the second separation can vary. For example, second separation can range from about 0.05 mm to about 0.25 mm, to about 0.50 mm.

Electrochemical cell 100 can be configured to transition from first configuration to second configuration and second configuration to third configuration based on the changing magnitude of closing force 210 and opening force 200 during operation. In addition, electrochemical cell 100 can also transition from third configuration to second configuration and second configuration to first configuration based on the changing magnitude of closing force 210 and opening force 200. It is contemplated that transitioning between first configuration, second configuration, and third configuration can occur continuously during the operation in response to the changing magnitude of closing force 210 and opening force 200.

In other embodiments, it is contemplated that the modulus of elasticity of the seals can be different instead of the thickness of the seals to enable the dispersed unseating of the seals. In yet another embodiment, both the thickness and the modulus of elasticity can be varied.

The arrangement of the seals as described above can be classified as a cascade seal configuration. The cascade seal configuration can provide several advantages. For example, the cascade seal configuration can limit the potential of high pressure hydrogen escaping electrochemical cell 100 by providing seal redundancy in the form of three levels of sealing protection. Reducing the potential of hydrogen leaks can benefit safety and energy efficiency.

In addition, the cascade seal configuration can also allow for self-regulation of pressure. Self-regulation of pressure can be achieved because of the disparity in seal thickness and the resulting dispersed unseating of first seal 171, second seal 181, and third seal 191. For example, when electrochemical cell 100 is in second configuration as shown in FIG. 4B, first seal 171 can unseat allowing first fluid 172 to leak into intermediate pressure zone 180. First fluid 172 leaking into intermediate pressure zone 180 can bleed pressure from high pressure zone 170. By bleeding pressure from high pressure zone 170, opening force 200 can be reduced. The drop in opening force 200 can allow the first separation of bipolar plates 150, 160 to be reversed causing the transition of electrochemical cell 100 from second configuration to first configuration and the reseating of first seal 171.

First fluid 172 that leaks by first seal 171 can combine with second fluid 182 and be utilized by electrochemical cell 100, in effect, the leaked first fluid 172 can be recycled. A consequence of this leaking and subsequent recycling can be a loss in compression efficiency because the leaked hydrogen is "pumped" through PEM 130 twice. However, the potential loss in compression efficiency is still less than the overall loss in efficiency would be if the leaked hydrogen was not recovered an instead leaked to the exterior of electrochemical cell 100 and was lost.

In the event the bleeding of pressure from high pressure zone 170 is not enough to cause the transition from second configuration to first configuration, second separation may occur causing electrochemical cell to transition from second configuration to third configuration. In third configuration as shown in FIG. 4C, the second separation of bipolar plates 150, 160 can cause second seal 181 to unseat allowing second fluid 182 to leak into low pressure zone 190. Second fluid 182 leaking into low pressure zone 190 can bleed pressure from intermediate pressure zone 180. By bleeding pressure from intermediate pressure zone 180, opening force 200 can be further reduced. The drop in opening force 200 can allow the second separation of bipolar plates 150, 160 to be reversed causing the transition of electrochemical cell 100 from third configuration to second configuration and the reseating of at least second seal 181.

The consequence of bleeding second fluid 182 from intermediate pressure zone 180 to low pressure zone 190 can be a loss of cell efficiency. However, a benefit can be reducing the possibility of second fluid 182 (i.e., hydrogen gas) from escaping electrochemical cell 100.

In various embodiments, the pressure of third fluid 192 in low pressure zone 190 can be monitored. The unseating of second seal 181 can result in a pressure increase in low pressure zone 190 caused by the bleeding of second fluid 182 pressure into low pressure zone 190. Therefore, by monitoring the pressure of third fluid 192 the unseating of second seal 181 and the leaking for second fluid 182 can be detected. In addition, electrochemical cell 100 can be configured to shut down before the pressure in low pressure zone 190 reaches a critical pressure. The critical pressure can be set just below the pressure at which third seal 191 would unseat allowing first fluid 172, second fluid 182, and third fluid 192 to escape electrochemical cell 100. In another embodiment, the composition of third fluid 192 can be monitored to detect the presence of a foreign fluid (e.g., first fluid 172 or second fluid 182). A detection sensor (e.g., hydrogen sensor) can be used to detect the presence of foreign fluid in low pressure zone 190.

Monitoring the pressure can be accomplished in a variety of means. For example, a pressure transmitter could be configured to read the pressure in low pressure zone 190 and when the pressure reaches the critical pressure set point the electrical potential to anode 110 and cathode 120 could be turned off preventing further hydrogen from getting "pumped" across PEM 130.

In other embodiments, the pressure of second fluid 182 in intermediate pressure zone 180 and first fluid 192 in high pressure zone 190 can also be monitored. For example, monitoring the pressure of second fluid 182 can allow the cell to be shut down before the pressure reaches the point where second seal 181 could unseat.

In various embodiments, when first fluid 172 or second fluid 182 (e.g., high or low pressure hydrogen) bleeds into low pressure zone 190 it can combine with third fluid 192 (e.g., coolant fluid) and can be carried out of low pressure zone 190 by the circulating third fluid 192.

Figure 5:
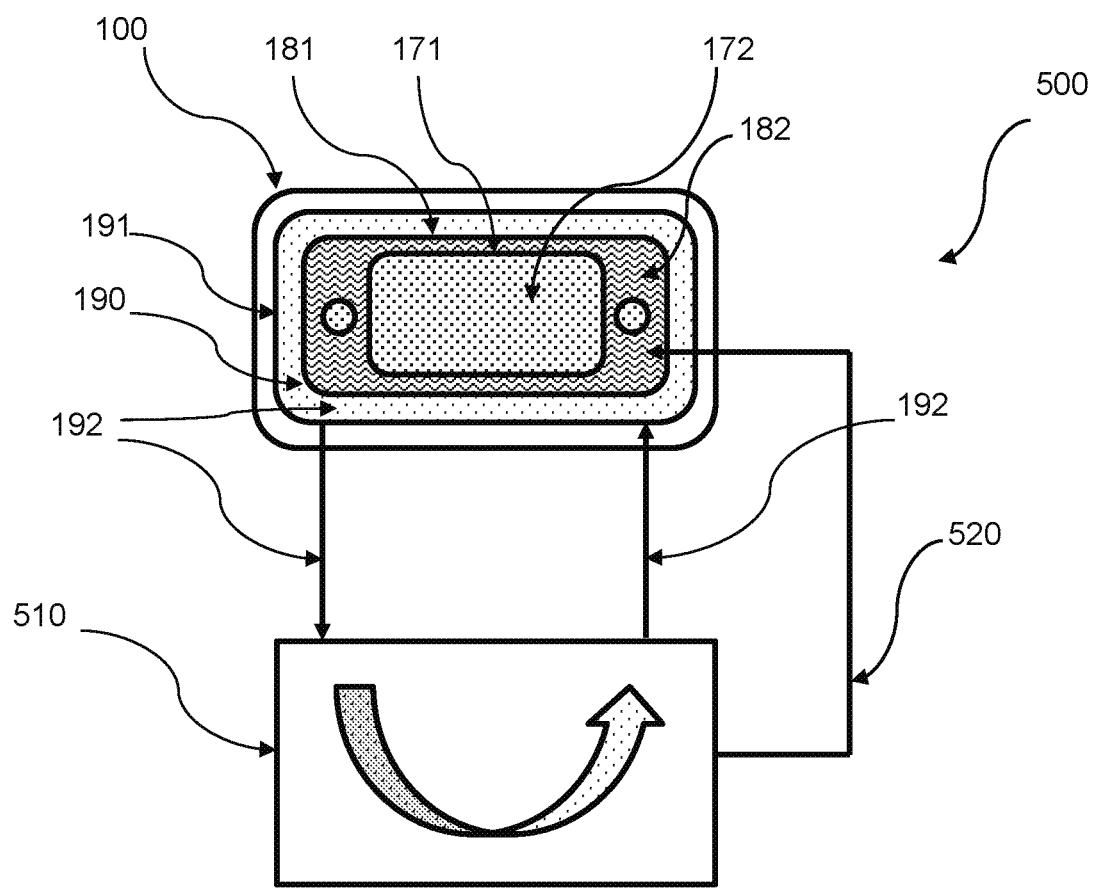
FIG. 5 is schematic diagram showing an electrochemical hydrogen reclamation system, according to an exemplary embodiment.

FIG. 5 shows an electrochemical hydrogen reclamation system (EHRS) 500, according to an exemplary embodiment. EHRS 500 can comprise an electrochemical cell 100 as described above having a cascade seal configuration. In addition to electrochemical cell 100, EHRS 500 can comprise a hydrogen reclamation apparatus 510. Apparatus 510 can be in fluid communication with low pressure zone 190 and intermediate pressure zone 180 of electrochemical cell 100. Apparatus 510 can receive third fluid 192 discharged from low pressure zone 190 and can be configured to recover at least a portion of any second fluid 182 contained in third fluid 192. After third fluid 192 passes through hydrogen reclamation apparatus 510, third fluid can be resupplied to low pressure zone 190. Any second fluid 182 recovered from third fluid 192 by hydrogen reclamation apparatus 510 can be reintroduced into intermediate pressure zone 180 by way of a recycle line 520 configured to fluidly connect hydrogen reclamation apparatus 510 and intermediate pressure zone 180. Recycling second fluid 182 can improve overall system efficiency. When second fluid 182 is hydrogen gas, for example, recycling second fluid 182 reduces the amount of new hydrogen required.

Hydrogen reclamation apparatus 510 can use a variety of technologies to separate second fluid 182 from third fluid 192. For example, dissolved gas separation from liquid coolant or hydrogen separation membrane from a nitrogen blanket.

In various embodiments, EHRS 500 can be configured to monitor the pressure of third fluid 192 in low pressure zone 190. By monitoring the pressure of third fluid 192 in low pressure zone 190, hydrogen reclamation apparatus 510 can be configured to only be engaged or energized when an increased pressure has been detected, which can indicate second seal 182 has unseated and second fluid has leaked into low pressure zone 190. By limiting the use of hydrogen reclamation apparatus the overall system efficiency can be increased.

In other embodiments, when first fluid 172 or second fluid 182 (e.g., high or low pressure hydrogen) bleeds into low pressure zone 190 and combines with third fluid 192 (e.g., coolant fluid), it can be circulated with third fluid 192 and remain circulating until third fluid 192 is discharged rather than be recovered or reclaimed from third fluid 192.

Electrochemical cell 100 can operate at differential pressures higher than about 15,000 psi. For example, a differential pressure can be measured as the difference between second fluid 182 pressure (i.e., the inlet hydrogen pressure) which can range from about −10 psi to about 0 psi, or from about 0 psi to about 25 psi, about 100 psi, about 500 psi, about 1,000 psi, or about 6,000 psi and first fluid 172 pressure (i.e., compressed hydrogen pressure) which can range from the lower bound of the inlet hydrogen pressure to higher than about 15,000 psi. The differential pressure as described above can be the differential pressure experienced by first seal 171. Second seal 181 can experience differential pressure between second fluid 182 and third fluid 192 ranging between about 0 psi to about 25 psi, about 100 psi, about 500 psi, about 1,000 psi, or about 6,000 psi.

The cascade seal configuration describe above can enable closing force 210 to be tuned (i.e., increased or decreased) to a particular opening force 200. Traditionally closing force 210 can be set to deliver a preload on first seal 171, second seal 181, and third seal 191 sufficient to withstand the expected opening force 200 caused by the internal pressure. However, by changing the preload or adjusting closing force 210 during operation of electrochemical cell 100, the pressure at which first seal 171, second seal 181, and third seal 191 unseat can be tuned so they each unseat and leak at a preferred particular pressure.

The tuning capability of electrochemical cell 100 can be used to enhance the safety of the device. As described above, unseating of the seals enables the bleeding of high pressure and the reseating of the seals. Therefore, by tuning closing force 210, electrochemical cell can be configured so that the seals are the first component to react to a pressure increase instead of another component that's failure could result in release of hydrogen.

Figure 6:
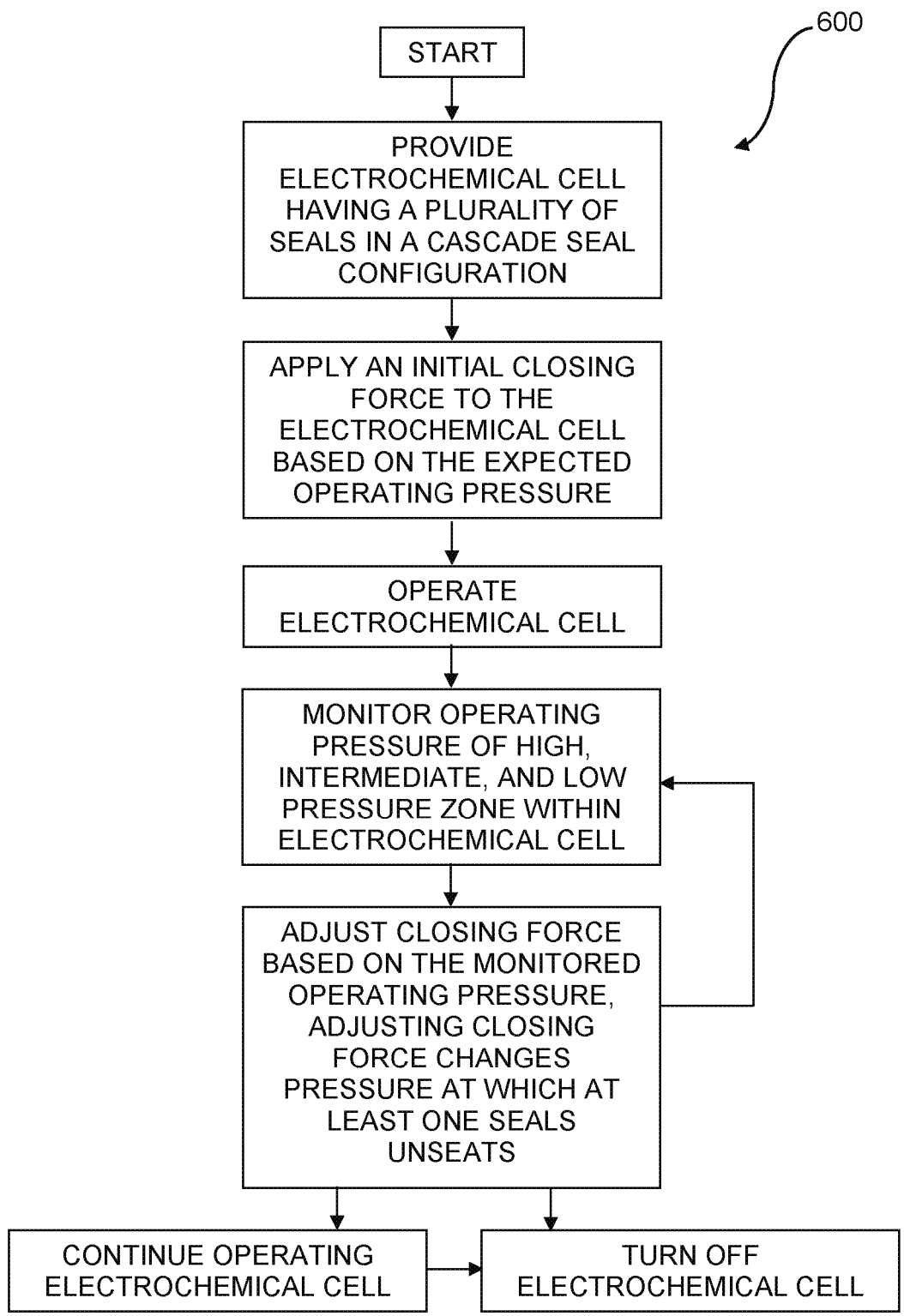
FIG. 6 is a flow diagram illustrating a method of controlling the pressure within an electrochemical cell, according to an exemplary embodiment.

FIG. 6 shows a flow chart 600, for a method of tuning the seals of electrochemical cell 100. The method can include providing electrochemical cell 100, which can have a plurality of seals in a cascade seal configuration as described above. Next, the method can include applying an initial closing force to the electrochemical cell based on the expected operating pressure. After applying an initial closing force the cell can be energized and operation can begin. During operation the pressure of the low, intermediate, and high pressure zones within electrochemical cell 100 can be monitored continuously or intermittently. Based on the monitored pressures and the resulting opening force the closing force can be adjusted. Adjusting the closing force can change the pressure at which at least one of the plurality of seals unseats. This process can continue throughout the operation of the electrochemical cell or can be configured to run for only a finite period of time initially at startup. As required, operation of electrochemical cell can be ended.

Figure 7:
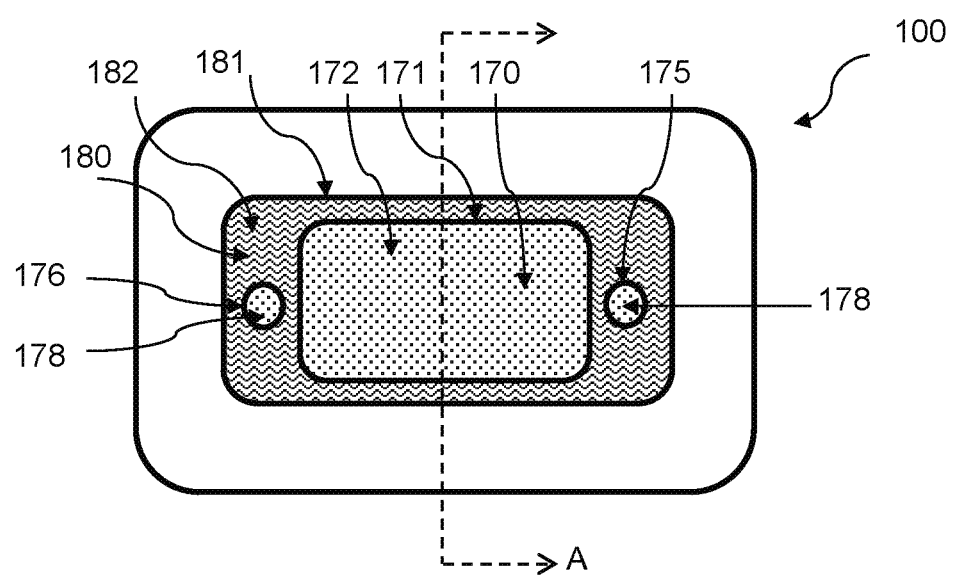
FIG. 7 is a front view of part of an electrochemical cell, showing the various seals and pressure zones of the cell, according to another embodiment.

More or fewer seals and pressure zones are contemplated. For example, in another embodiment as shown in FIG. 7, electrochemical cell 100 can comprise a first seal 171 and second seal 181. Accordingly, electrochemical cell 100 as shown in FIG. 7 can comprise a first seal 171 defining a high pressure zone 170. First seal 171 can be located between the bipolar plates 150, 160 and configured to contain a first fluid 172 with high pressure zone 170. Electrochemical cell 100 can further comprise a second seal 181 defining an intermediate pressure zone 180. Second seal 182 can be located between bipolar plates 150, 160 and configured to contain second fluid 182 within intermediate pressure zone 180. First seal 171 can be contained entirely with second seal 181. Electrochemical cell 100 can further comprise ancillary first seals 175, 176. Ancillary seal 175 and 176 can be located outside first seal 171, but within second seal 181.

In addition, with regard to electrochemical cell 100, first fluid 172 can be at a higher pressure than second fluid 182. First seal 171 and second seal 181 can have a generally rectangular cross-section. The thickness of second seal 181 can be greater than first seal 171. First seal 171 can be configured to leak first fluid 172 into intermediate pressure zone 180 when first seal 171 unseats. In such an embodiment, electrochemical cell 100 can be configured to shutdown prior to the unseating of second seal 181 reducing the possibility of second fluid 182 leaking from intermediate pressure zone 180.

First seal 171 and second seal 181 within electrochemical cell 100 can be configured to remain seated preventing the leaking of first fluid 172 and second fluid 182 when a closing force being applied to bipolar plates 150, 160 is greater than the opening force within bipolar plates 150, 160. When closing force applied to bipolar plates 150, 160 approaches the opening force within bipolar plates 150, 160, first seal 171 can be configured to unseat before second seal 181 unseats causing first fluid 172 to leak past first seal 171 into intermediate pressure zone 180. First fluid 172 that leaks past first seal 171 can combine with second fluid 182 and be recycled.

In other embodiments, a cascade seal configuration similar to the description above can be utilized with a two-piece bipolar plate. For example, bipolar plate 150 and 160, according to some embodiments, can each be formed of two pieces. A two-piece bipolar plate can be advantageous for various reasons. For example, reduced manufacturing cost, flexibility in manufacturing, reduced material cost, increased serviceability, and improved material selection capability (e.g., electrical conductivity and corrosion resistance). In other embodiments, bipolar plate 150 and 160 can be confirmed from a plurality of pieces.

A cascade seal configuration between the two pieces of the bipolar plate can be configured for capture, recovery, or reclamation of fluid (e.g., hydrogen) leaked between the two-pieces, as described further below. Otherwise, the fluid leaked from the electrochemical cell or stack could create a potential safety issue. In addition, a volume of fluid could build up between the two pieces of the bipolar plate if the fluid is unable to vent. The trapped high pressure fluid can cause damage to the bipolar plate and potentially cause further leaking.

Figure 8:
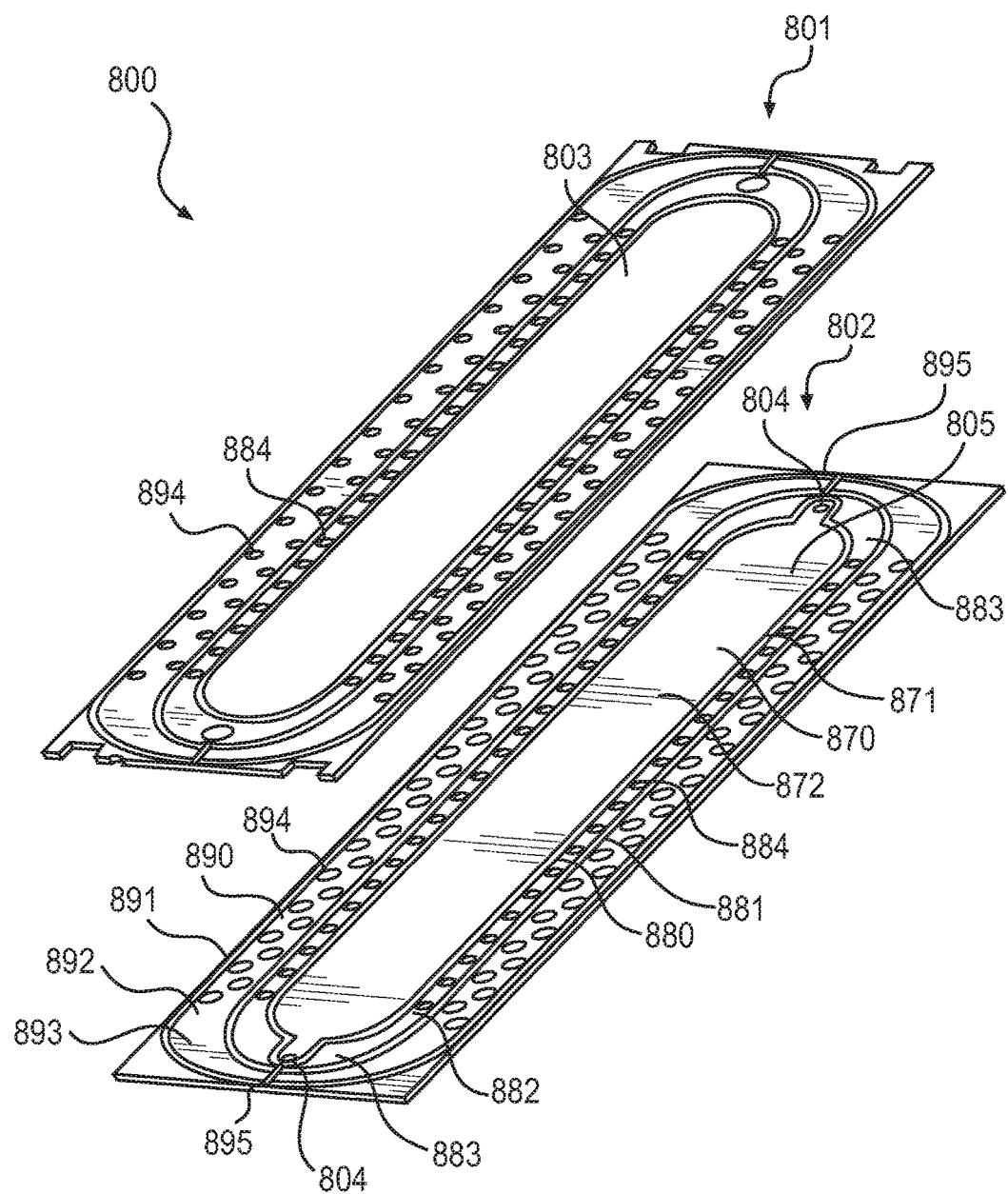
FIG. 8 is an isometric view of a two-piece bipolar plate, according to an exemplary embodiment.

FIG. 8 shows one embodiment of bipolar plates 150 and 160 comprising a two-piece bipolar plate 800 comprising a first component 801 and a second component 802 configured for a cascade seal configuration. First component 801 can form a void 803 in fluid communication with a flow structure 805.

Electrochemical cell 100, as shown in FIG. 1, can further comprise electrically-conductive gas diffusion layers (GDLs) (not shown) within electrochemical cell 100 on each side of MEA 140. GDLs can serve as diffusion media enabling the transport of gases and liquids within the cell, provide electrical conduction between bipolar plates 150 and 160 and PEM 130, aid in the removal of heat and process water from the cell, and in some cases, provide mechanical support to PEM 140. In addition, channels (not shown), known as flow fields, in bipolar plates 150 and 160 can be configured to supply gases to anode 110 and cathode 120 of MEA 140. Reactant gases on each side of PEM 130 can flow through flow fields and diffuse through the porous GDLs. The flow fields and the GDLs can be positioned contiguously and coupled by the internal fluid streams. Accordingly, the flow field and the GDL can collectively form flow structure 805.

First component 801 and second component 802 can be generally flat and have a generally rectangular profile. In other embodiments, components 801 and 802 can have a profile shaped like a square, a "race-track" (i.e., a substantially rectangular shape with semi-elliptical later sides), circle, oval, elliptical, or other shape. The shape of first component 801 and second component 802 can correspond to the other components of electrochemical cell 100 (e.g., cathode, anode, PEM, flow structure, etc.) or electrochemical cell stack.

First component 801 and second component 802 can each be formed of one or more materials. First component 801 and second component 802 can be formed of the same materials or different materials. Component 801 and 802 can be formed of a metal, such as, stainless steel, titanium, aluminum, nickel, iron, etc., or a metal alloy, such as, nickel chrome alloy, nickel-tin alloy, or a combination there of.

First component 801 and second component 802 can comprise a clad material, for example, aluminum clad with stainless steel on one or more regions. Cladding can provide the advantages of both metals, for example, in the case of a bipolar plate fabricated from stainless steel-clad aluminum, the stainless steel protects the aluminum core from corrosion during cell operation, while providing the superior material properties of aluminum, such as, high strength-to-weight ratio, high thermal and electrical conductivity, etc. In other embodiments, first component 801 can comprise anodized, sealed, and primed aluminum.

In some embodiments, first component 801 can be formed of a composite, such as, carbon fiber, graphite, glass-reinforce polymer, thermoplastic composites. In some embodiments, first component 801 can be formed of a metal which is coated to prevent both corrosion and electrical conduction.

According to various embodiments, first component 801 can be generally non-conductive reducing the likelihood of shorting between the electrochemical cells. Second component 802 can be formed of one or more materials that provide electrical conductivity as well as corrosion resistance during cell operation. For example, second component 802 can be configured to be electrically conductive in the region where the active cell components sit (e.g., flow structure, MEA, etc.).

First component 801 and second component 802 can be configured for coplanar coupling. First component 801 and second component 802 can be releasably coupled or fixedly coupled. One or more attachment mechanisms can be used including, for example, bonding material, welding, brazing, soldering, diffusion bonding, ultrasonic welding, laser welding, stamping, riveting, resistance welding, or sintering. In some embodiments, the bonding material may include an adhesive. Suitable adhesives include, for example, glues, epoxies, cyanoacrylates, thermoplastic sheets (including heat bonded thermoplastic sheets) urethanes, anaerobic, UV-cure, and other polymers. In some embodiments, first component 801 and second component 802 can be coupled by a friction fit. For example, one or more seals between the components can produce adequate frictional force between the components when compressed to prevent unintended sliding.

In other embodiments, first component 801 and second component 802 can be releasably coupled using fasteners, for example, screws, bolts, clips, or other similar mechanisms. In other embodiments, compression rods and nuts can pass through bipolar plate 800 or along the outside and be used to compress first component 801 and second component 802 together as electrochemical cell 100 or a plurality of electrochemical cells 100 are compressed in a stack.

Coupled first component 801 and second component 802 can form a plurality of different pressure zones and a plurality of seals can define one or more different pressure zones. FIG. 8 shows the plurality of different seals and pressure zones. As shown in FIG. 8, the plurality of seals can include a first seal 871, a second seal 881, and a third seal 891. First seal 871 can be contained entirely within second seal 881 and second seal 881 can be contained entirely within third seal 891. The shape of first seal 871, second seal 881, and third seal 891 can generally correspond to the shape of bipolar plate 800, as shown in FIG. 8.

First seal 871, second seal 881, and third seal 891 can be a gasket, O-ring, or other sealing component. First seal 871, second seal 881, and third seal 891 can be made of an elastomeric or polymeric sealing material, for example, silicone, EPDM (ethylenepropylene-diene-monomer), fluoroelastomer, nitrile rubber (Buna-N), PTFE (polytetrafluoroethylene), polysulfone, polyetherimide, polychenylene sulfide, PEEK (polyether ether ketone), polyimide, PET (polyethylene terephthalate), PEN (polyethylene naphthalate), HDPE (high-density polyethylene), polyurethane, neoprene, acetal, nylon, polybutylene terephthalate, NBR (acrylonitrile-butadiene rubber), etc. The material of each seal can be different than the material of the other seals, the material can be the same for just two of the seals, or the material can be the same for all the seals.

In some embodiments, first seal 871, second seal 881, and third seal 891 can be a knife-edge type seal or an adhesively-bonded seal. For example, second component 802 can include protrusions or "teeth" like projections in the location of first seal 871 configured to plastically deform first seal 871. In yet another example, an adhesively-bonded seal can be formed by a continuous, void and gap free application of an adhesive. In other embodiments, first seal 171, second seal 181, and third seal 191 can be formed of flat gasket material that can be cut in an enlarging pattern configured to maintain the cascade configuration. In another embodiment, a thin plastic sheet can be placed in between first component 801 and second component 802 which forms a gasket seal under a compressive load of the electrochemical cell or stack.

First seal 871 can define a portion of high pressure zone 870 and be configured to contain a first fluid 872 (e.g., hydrogen) within high pressure zone 870. First seal 871 can delimit the outer boundaries of high pressure zone 870 at least between components 801 and 802. High pressure zone 870 can include flow structure 805 extending through void 803 when first component 801 and second component 802 are coupled. First fluid 872 can flow throughout high pressure zone 870 thorough flow structure 805 from cathode 130.

Hydrogen formed at cathode 130 can be collected in high pressure zone 870 and the connection between first component 801 and second component 802 can be sealed by first seal 871. Hydrogen within high pressure zone 870 can be compressed and, as a result, increase in pressure as more and more hydrogen is formed in high pressure zone 870. Hydrogen in high pressure zone 870 can be compressed to a pressure greater than 15,000 psi. Pressure within high pressure zone 870 can apply a separation force on first component 801 and second components 802.

As shown in FIG. 8, first seal 871 can be configured to extend around the exterior of common passages 804. Common passages 804 can be configured to supply or discharge first fluid 872 from high pressure zone 870. Common passages 804 can be in fluid communication with common passages of adjacent electrochemical cells in a multi-cell electrochemical compressor.

Second seal 881 can define the outer circumference of intermediate pressure zone 880. Intermediate pressure zone 880 can comprise an intermediate pressure volume 883 delimited by first seal 871, second seal 881, first component 801 and second component 802. Intermediate pressure zone 880 can be configured to contain a second fluid 882. Intermediate pressure zone 880 can further comprise one or more intermediate pressure ports 884.

Intermediate pressure volume 883 can be configured to collect and direct second fluid 882 to intermediate pressure ports 884. As shown in FIG. 8, intermediate pressure volume 883 can extend around the circumference of high pressure zone 870 separated by first seal 871. The cross-sectional area and volume of intermediate pressure volume 883 can vary based on the geometry of first component 801, second component 802, first seal 871, and second seal 881.

In other embodiments, intermediate pressure volume 883 can be separated into a plurality of intermediate pressure volumes 883, for example, 2, 3, 4 or more intermediate pressure volumes 883. The plurality of intermediate pressure volumes 883 can be separated by a plurality of seals. As shown in FIG. 8, intermediate pressure volume 883 can be separated into two intermediate pressure volumes 883. For example, as shown in FIG. 8, first seal 871 can extend across intermediate pressure volume 883 to second seal 881. The portions of first seal 881 that extend around common passages 804 can connect with second seal 882 separating intermediate pressure volume 883 into two intermediate pressure volumes 883.

As shown in FIG. 8, the one or more intermediate pressure volumes 883 can each be in fluid communication with one or more intermediate pressure ports 884. Intermediate pressure ports 884 can be configured to discharge second fluid 882 contained within intermediate pressure volumes 883. The shape of intermediate pressure ports 884 can vary. For example, intermediate pressure ports 884 can be square, rectangle, triangle, polygon, circle, oval, or other shape. The number of intermediate pressure ports 884 per intermediate pressure volume 883 can vary from 1 to about 25 or more. The cross-sectional area of intermediate pressure ports 884 can vary. For example, the diameter of circular intermediate pressure ports 884 can range from less than about 0.1 inch to about 1 inch or more. As shown in FIG. 8, intermediate pressure ports 884 can be evenly spaced between first seal 871 and second seal 881 and evenly distributed along the length of bipolar plate 800. In other embodiments, intermediate pressure ports 884 can extend the full circumference of intermediate pressure zone 880.

Second fluid 882 discharged via intermediate pressure ports 884 can be resupplied to electrochemical cell 100. For example, second fluid 882 can return to intermediate pressure zone 180. In other embodiments, second fluid 882 discharged via intermediate pressure ports 884 can be collected and recycled. Second fluid 882 in intermediate pressure zone 880 can generally be lower pressure than first fluid 872 in high pressure zone 870.

Third seal 891 can define low pressure zone 890 and be configured to contain a third fluid 892 within low pressure zone 890. Low pressure zone 890 can comprise a low pressure volume 893 delimited by second seal 881, third seal 891, first component 801, and second component 802. Low pressure zone 890 can be configured to contain a third fluid 892. Low pressure zone 890 can further comprise one or more low pressure ports 894.

Low pressure volume 893 can be configured to collect and direct third fluid 892 to low pressure ports 894. As shown in FIG. 8, low pressure volume 893 can extend around the circumference of intermediate pressure zone 880 separated by second seal 881. The cross-sectional area and volume of low pressure volume 893 can vary based on the geometry of first component 801, second component 802, second seal 881, and third seal 891. According to various embodiments, the intermediate pressure volume 883 can be greater than or less than the volume of low pressure volume 893.

In other embodiments, low pressure volume 893 can be separated into a plurality of intermediate pressure volumes 893, for example, 2, 3, 4 or more low pressure volumes 893. The plurality of low pressure volumes 893 can be separated by a plurality of seals. As shown in FIG. 9, low pressure volume 893 can be separated into two low pressure volumes 893. For example, one or more bridge seals 895 can extend across low pressure volume 883 from second seal 881 to third seal 891.

As shown in FIG. 8, the one or more low pressure volumes 893 can each be in fluid communication with one or more low pressure ports 894. Low pressure ports 894 can be configured to discharge third fluid 892 contained within low pressure volumes 893. The shape of low pressure ports 894 can vary. For example, low pressure ports 894 can be square, rectangle, triangle, polygon, circle, oval, or other shape. The number of low pressure ports 894 per low pressure volume 893 can vary from 1 to about 50 or more. The cross-sectional area of low pressure ports 894 can vary. For example, the diameter of circular low pressure ports 894 can range from less than about 0.1 inch to about 1 inch or more. As shown in FIG. 8, low pressure ports 894 can be spaced between second seal 881 and third seal 891 and evenly staggered along the length of bipolar plate 800. In other embodiments, low pressure ports 894 can extend the full circumference of low pressure zone 890.

Third fluid 892 discharged via low pressure ports 894 can be resupplied to electrochemical cell 100. For example, third fluid 892 can return to low pressure zone 190. In other embodiments, third fluid 892 discharged via intermediate pressure ports 894 can be collected and recycled. Third fluid 892 in low pressure zone 890 can generally be lower pressure than first fluid 872 in high pressure zone 870 and second fluid 882 in intermediate pressure zone 880.

The cascade seal configuration between first component 801 and second component 802 as described above can be implemented in bipolar plate 150 and 160 of electrochemical cell 100, as described above. In other embodiments, the cascade seal configuration between components 801 and 802 can be implemented in other electrochemical cells in which a cascade seal configuration is not utilized between the two bipolar plates. Therefore, both cascade seal configurations as described above can be independent of one another such that either one can be utilized individually in a electrochemical cell or they can be utilized in conjunction in the same electrochemical cell.

In some embodiments, first component 801 and second component 802 can include interlocking features. The interlocking features may form a mating geometry sufficient to secure first component 801 and second component 802 together. For example, first component 801 may comprise one or more protrusions, and second component 802 may comprise one or more indentations. However, it is further contemplated first component 801 and second component 802 may comprise various attachment mechanisms. Interlocking features may comprise various shapes and sizes. For example, protrusions and indentations may be formed cylindrical, round, elliptical, rectangular, or square in shape. Additionally, protrusions and indentations may include various polygonal shapes.

As shown in FIG. 8, interlocking features may include various connections configured to seal first component 801 and second component 802. For example, interlocking features may include first seal 871, second seal 881, and third seal 891 and the corresponding seal cavity in which they can rest. First component 801 and second component 802 can include a plurality of seal cavities configured to receive at least a portion of first seal 871, second seal 881, and third seal 891. Each seal cavity can comprise an extrusion into first component 801, second component 802 or both components 801 and 802. The extrusion dimensions and geometry can correspond to the dimensions and cross-sectional geometry of first seal 871, second seal 881, and third seal 891.

In other embodiments, the number of pressure zones between first component 801 and second component 802 can be greater than or less than three (i.e., high, intermediate, and low). For example, a first component 801 and second component 802 could comprise just two pressure zones (e.g., high and low) or could comprise four or more pressure zones (e.g., high-high, high, intermediate, and low). In yet another embodiment, the pressure zones could cascade, but not cascade down sequentially in pressure.

A bipolar plate similar to bipolar plate 800 having just two pressure zones could comprise a first component, a second component, a seal formed between the two components separating the two pressure zones, a volume surrounding the seal, and at least one port in fluid communication with the volume configured to discharged fluid collected in the volume.

In other embodiments, it is contemplated that the volume surrounding can be configured to extend around only a portion of the seal. For example, volume chambers could be distributed around the circumference of each seal within each pressure zone.

During operation, the cascade seal configuration between first component 801 and second component 802, as described above, can enable collection and recycling or reclamation of fluid leaked from high pressure zone 870 to intermediate pressure zone 880 and low pressure zone 890 between components 801 and 802. As mentioned above, first fluid 872 within high pressure zone 870 can be compressed to pressures exceeding 15,000 psi. The pressure of first fluid 872 can apply a separation force on first seal 871, first component 801, and second component 802. When the coupling force of first component 801 and second component 802 is sufficient to counter act the separation force and maintain the connection and first seal 871 is functioning properly, then first fluid 871 can be prevented from leaking from high pressure zone 870 past first seal 871 into intermediate pressure zone 880.

On the other hand, when the coupling force is insufficient to maintain the connection or first seal 871 malfunctions the first fluid 872 can leak from high pressure zone 870 past first seal 871 into intermediate pressure zone 880. First fluid 872 leaked into intermediate pressure zone 880 can be collected in intermediate pressure volume 883 and constitute second fluid 882. First fluid 872/second fluid 882 collected in intermediate pressure volume 883 can flow to and out through intermediate pressure ports 884. The discharged fluid (i.e., first fluid 872/second fluid 882) can be recycled or reclaimed rather than lost, which was traditionally the case in other two-piece bipolar designs.

Low pressure zone 890 can provide an additional level of leak protection. Second fluid 882 that leaks past second seal 881 can be collected in low pressure volume 893 and constitute third fluid 892. Second fluid 882/third fluid 892 collected can flow to and out through low pressure ports 894. Like the other discharged fluid, second fluid 882/third fluid 892 can be recycled or reclaimed. Flow through intermediate pressure ports 884 and low pressure ports 894 can be controlled down steam. For example, one or more valves can open or close to allow fluid to be discharged. The flow through intermediate pressure ports 884 can be continuous or intermittent.

The method of using the cascade seal configuration can comprises collecting fluid (e.g., first fluid 872, second fluid 882, and third fluid 892) within different volumes (e.g., intermediate pressure volume 883 or low pressure volume 893) separated by a plurality of seals (e.g., first seal 871, second seal 881, and third seal 891) and discharging the collected fluid through pressure ports (e.g., intermediate pressure ports 884 and low pressure ports 894) and then recycling the discharged fluid.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. An electrochemical cell comprising:
   a pair of bipolar plates;
   a membrane electrode assembly, wherein the membrane electrode assembly comprises an anode, a cathode, and a proton exchange membrane disposed therebetween;
   a first seal located between the bipolar plates and configured to partially define a high pressure zone; and
   a pair of flow structures having gas diffusion layers, wherein the flow structures are positioned between the bipolar plates on each side of the membrane electrode assembly;

wherein at least one of the bipolar plates includes a first component and a second component and the first component and the second component define a void that houses the flow structures and the membrane electrode assembly.

2. The electrochemical cell of claim 1, further comprising a second seal located between the bipolar plates and configured to partially define an intermediate pressure zone.

3. The electrochemical cell of claim 2, further comprising a third seal located between the bipolar plates and configured to partially define a low pressure zone.

4. The electrochemical cell of claim 3, wherein the first seal is contained within the second seal and the second seal is contained within the third seal.

5. The electrochemical cell of claim 3, wherein the thickness of the third seal is greater than the second seal and the thickness of the second seal is greater than the first seal.

6. The electrochemical cell of claim 3, wherein the high pressure zone is configured to contain high pressure hydrogen, the intermediate pressure zone is configured to contain lower pressure hydrogen, and the low pressure zone is configured to contain coolant fluid.

7. The electrochemical cell of claim 2, wherein a pressure of a fluid in the low pressure zone is monitored and a rise in the pressure indicates an unseating of at least the second seal, and wherein the electrochemical cell is configured to shut down before the third fluid reaches a pressure at which the third seal unseats.

8. The electrochemical cell of claim 2, wherein the first seal, the second seal, and the third seal within the pair of bipolar plates are configured to remain seated when a closing force being applied to the pair of bipolar plates is greater than the opening force within the pair of bipolar plates.

9. The electrochemical cell of claim 1, wherein the first seal is formed from at least one of silicone, ethylenepropylene-diene-monomer (EPDM), fluoroelastomer, nitrile rubber (Buna-N), polytetrafluoroethylene (PTFE), polysulfone, polyetherimide, polychenylene sulfide, polyether ether ketone (PEEK), polyimide, polyethylene terephthalate (PET), polyethylene naphthalate (PEN), high-density polyethylene (HDPE), polyurethane, neoprene, acetal, nylon, polybutylene terephthalate, and acrylonitrile-butadiene rubber (NBR).

10. The electrochemical cell of claim 1, wherein the first seal is a knife-edge type seal.

11. The electrochemical cell of claim 1, wherein the electrochemical cell is at least one of a hydrogen fuel cell, hydrogen purifier, hydrogen expander, and hydrogen compressor.

12. The electrochemical cell of claim 1, wherein the first seal has a generally rectangular cross-section.

13. The electrochemical cell of claim 4, wherein the first seal is configured to unseat before the second seal or the third seal when a closing force applied to the pair of bipolar plates approaches an opening force within the pair of bipolar plates, which causes a first separation of the pair of bipolar plates.

14. The electrochemical cell of claim 13, wherein the second seal is configured to unseat when the closing force further approaches the opening force causing a second separation of the pair of bipolar plates.

* * * * *